(12) United States Patent
Kim

(10) Patent No.: US 9,346,446 B2
(45) Date of Patent: May 24, 2016

(54) APPARATUS AND METHOD FOR INITIALIZING OF ELECTROMECHANICAL BRAKE

(71) Applicant: HYUNDAI MOBIS CO., LTD., Seoul (KR)

(72) Inventor: Jong Sung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 71 days.

(21) Appl. No.: 14/202,626

(22) Filed: Mar. 10, 2014

(65) Prior Publication Data

US 2015/0136538 A1  May 21, 2015

(30) Foreign Application Priority Data

Nov. 21, 2013 (KR) ........................ 10-2013-0142511

(51) Int. Cl.
| | |
|---|---|
| *B60T 13/00* | (2006.01) |
| *B60T 13/68* | (2006.01) |
| *B60T 13/58* | (2006.01) |
| *B60T 13/66* | (2006.01) |
| *B60T 13/74* | (2006.01) |

(52) U.S. Cl.
CPC .............. *B60T 13/686* (2013.01); *B60T 13/588* (2013.01); *B60T 13/662* (2013.01); *B60T 13/741* (2013.01)

(58) Field of Classification Search
CPC ... B60T 13/686; B60T 13/588; B60T 13/662; B60T 13/741

USPC .............. 303/20, 3, 57, 61, 68, 119.1, 119.2, 303/155, 157, 158
See application file for complete search history.

(56) References Cited

U.S. PATENT DOCUMENTS

| | | | | |
|---|---|---|---|---|
| 2002/0020591 | A1* | 2/2002 | Schanzenbach et al. | 188/158 |
| 2008/0093917 | A1* | 4/2008 | Vescovini et al. | 303/3 |
| 2014/0103237 | A1* | 4/2014 | Herges | 251/129.01 |

FOREIGN PATENT DOCUMENTS

KR  1996-0022048 A  7/1996

* cited by examiner

*Primary Examiner* — Pamela Rodriguez
(74) *Attorney, Agent, or Firm* — Knobbe Martens Olson & Bear LLP

(57) ABSTRACT

An apparatus for initializing an electromechanical brake (EMB) may include: a solenoid valve for transmitting oil pressure generated through a manipulation force for a brake pedal; a piston unit for pressurizing a brake disk through at least one of the oil pressure transmitted through the solenoid valve and power generated by a motor; and an electronic control unit for controlling at least one of the oil pressure transmitted through the solenoid valve and the power transmitted by the motor to control advance and retreat of pistons included in the piston unit and adjust a braking force of the brake, wherein when the brake system is initialized, the electronic control unit retreats and depressurizes the pistons when a vehicle is in a parking brake state, and advances and pressurizes the pistons in case where the vehicle is not in a parking brake state.

9 Claims, 3 Drawing Sheets

APPARATUS AND METHOD FOR INITIALIZING OF ELECTROMECHANICAL BRAKE

CROSS-REFERENCES TO RELATED APPLICATIONS

The present application claims priority to Korean application number 10-2013-0142511, filed on Nov. 21, 2013, which is incorporated by reference in its entirety.

BACKGROUND OF THE INVENTION

The present invention relates to an apparatus and method for initializing an electromechanical brake (EMB), and more particularly, to an apparatus and method for initializing an electromechanical brake, which distinguishes a parking brake state from a main brake state so as to initialize an electromechanical brake with a hydraulic device.

In general, a brake system of a vehicle adjusts the brake pressure of a wheel using a hydraulic modulator, in response to pedal pressure which occurs when a driver steps on a brake pedal.

At this time, a master cylinder connected to the brake pedal supplies oil pressure to a brake mechanism which provides a braking force to the wheel, in response to the pedal pressure. Furthermore, according to the oil pressure provided by the master cylinder, the brake mechanism advances a piston to pressurize a brake pad, in order to generate the braking force.

Recently, however, an electromechanical brake system has been used, which generates a braking force by advancing the piston of the brake mechanism through rotary power of a motor, without using the above-described oil pressure.

Such an electromechanical brake system uses a gear to convert the rotary power of the motor into forward and backward motion of the piston and to increase the rotary power of the motor. However, the electromechanical brake system using a gear may generate noise, and the mechanism including the gear may occupy a large space.

Furthermore, when the electromechanical brake system generates a braking force only through the motor, the brake may not be normally operated in case where the electrical system of the vehicle malfunctions. In this case, emergency braking is impossible.

The related art of the present invention is disclosed in Korean Patent Laid-open Publication No. 1996-0022048 published on Jul. 18, 1996 and entitled "Electromechanical brake system".

SUMMARY OF THE INVENTION

Embodiments of the present invention are directed to an apparatus and method for initializing an electromechanical brake, which distinguishes a parking brake state from a main brake state, and initializes an electromechanical brake by depressurizing a piston unit when a vehicle is in a parking brake state and pressurizing the piston unit when the vehicle is not in the parking brake state (that is, being in the main brake state), thereby matching the positions of master and slave pistons.

In one embodiment, an apparatus for initializing an electromechanical brake may include: a solenoid valve for transmitting oil pressure generated through a manipulation force for a brake pedal; a piston unit for pressurizing a brake disk through at least one of the oil pressure transmitted through the solenoid valve and power generated by a motor; and an electronic control unit for controlling at least one of the oil pressure transmitted through the solenoid valve and the power transmitted by the motor to control advance and retreat of pistons included in the piston unit and adjust a braking force of the brake. When the brake system is initialized, the electronic control unit retreats and depressurizes the pistons in case where a vehicle is in a parking brake state, and advances and pressurizes the pistons in case where the vehicle is not in a parking brake state.

The pistons of the piston unit may include a master piston which is directly pressurized by at least one of the oil pressure transmitted through the solenoid valve and the power generated by the motor and a slave piston which is pressurized by oil pressure generated through a pressurizing force of the master piston. The electronic control unit may control the piston unit to reach a state at which the master piston and the slave piston are contacted with each other.

The electronic control unit may close the solenoid valve and advance the pistons included in the piston unit to a point at which the pressure of the piston unit is not increased any more, in order to determine the state at which the master piston and the slave piston are contacted with each other.

The apparatus may further include a solenoid for locking the brake during parking brake operation. The electronic control unit may apply a voltage to the solenoid in a direction where the brake is released, and determine whether or not the vehicle is in a parking brake state, based on a current sensed through the solenoid, when the motor is rotated in a direction to pressurize the brake disk.

When the current sensed through the solenoid increases immediately after the rotation of the motor, the electronic control unit may determine that the vehicle is in a parking brake state. When the current increases in a predetermined time after the rotation of the motor, the electronic control unit may determine that the vehicle is not in a parking brake state.

In another embodiment, a method for initializing an electromechanical brake, may include: determining, by an electronic control unit, whether or not a vehicle is in a parking brake state; retreating and depressurizing, by the electronic control unit, pistons included in a piston unit, when the vehicle is in a parking brake state; advancing and pressurizing, by the electronic control unit, the pistons included in the piston unit, when the vehicle is not in a parking brake state; and controlling, by the electronic control unit, the piston unit to reach a state at which a master piston and a slave piston are contacted with each other. The pistons of the piston unit comprises the master piston which is directly pressurized by at least one of oil pressure transmitted through a solenoid valve and power generated by a motor and the slave piston which is pressurized by oil pressure generated through a pressurizing force of the master piston.

The electronic control unit may close the solenoid valve and advances the pistons included in the piston unit to a point at which the pressure of the piston unit is not increased any more, in order to determine the state at which the master piston and the slave piston are contacted with each other.

In the determining of whether or not the vehicle is in a parking brake state, the electronic control unit may apply a voltage to the solenoid in a direction where the brake is released, and may determine whether or not the vehicle is in a parking brake state, based on a current sensed through the solenoid, when the motor is rotated in a direction to pressurize the brake disk.

When the current sensed through the solenoid increases immediately after the rotation of the motor, the electronic control unit may determine that the vehicle is in a parking brake state, and when the current increases in a predetermined time after the rotation of the motor, the electronic control unit may determine that the vehicle is not in a parking brake state.

In accordance with the embodiments of the present invention, when the electromechanical brake system is initialized, the electronic control unit may depressurize the pistons in case where the vehicle is in a parking brake state, or pressurize the pistons in case where the vehicle is in a main brake state (not in a parking brake state). Thus, it is possible to match the positions of the master piston and the slave piston and substantially prevent a malfunction of the brake system.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
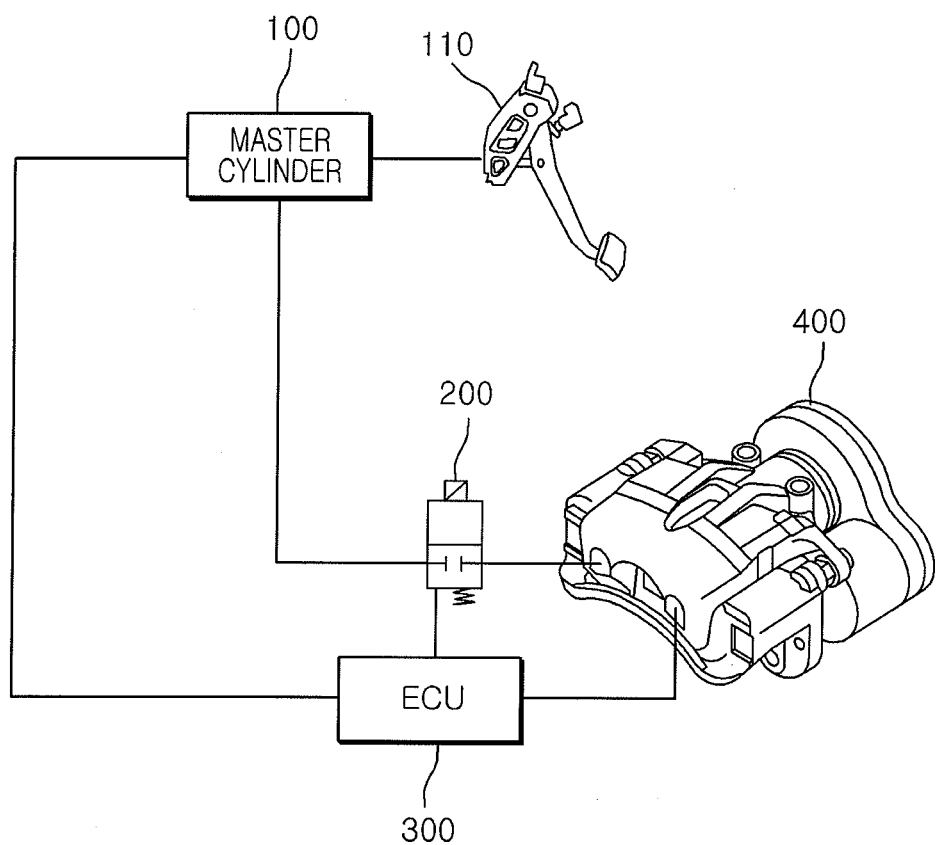
FIG. 1 is a block diagram illustrating an apparatus for initializing an electromechanical brake in accordance with an embodiment of the present invention.
Figure 2:
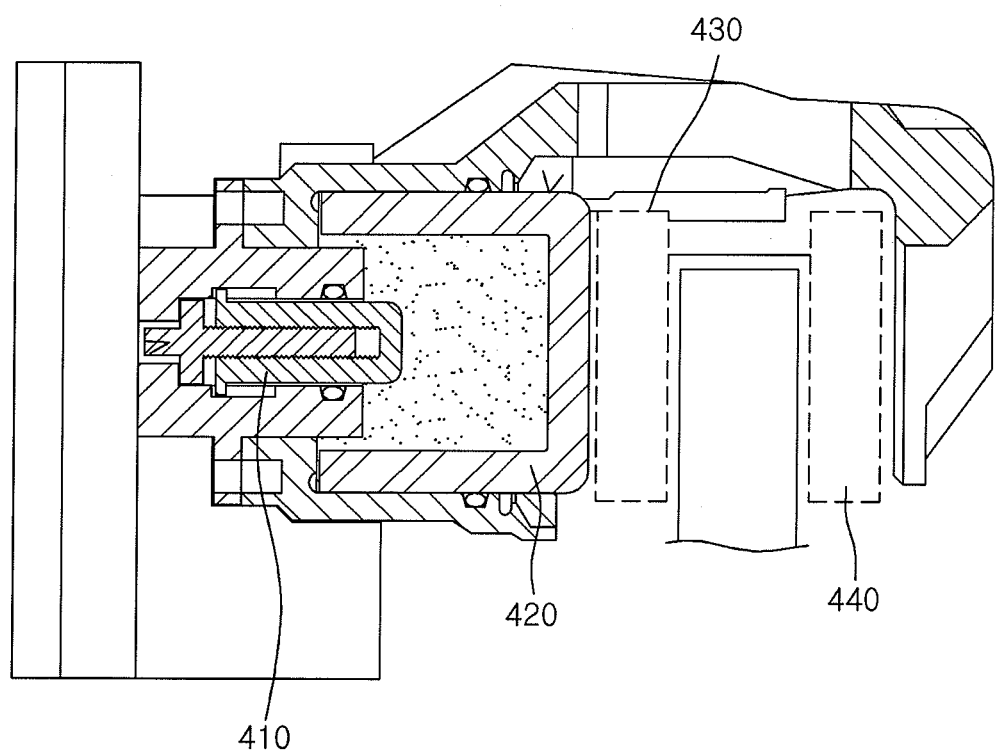
FIG. 2 is a diagram illustrating a piston unit of the apparatus for initializing an electromechanical brake in accordance with the embodiment of the present invention.

FIG. 1 is a block diagram illustrating an apparatus for initializing an electromechanical brake in accordance with an embodiment of the present invention. FIG. 2 is a diagram illustrating a piston unit of the apparatus for initializing an electromechanical brake in accordance with the embodiment of the present invention.

Referring to FIGS. 1 and 2, the apparatus for initializing an electromechanical brake in accordance with the embodiment of the present invention may include a solenoid valve 200, a piston unit of FIG. 2, and an electronic control unit 300.

As illustrated in FIG. 2, the brake mechanism 400 of FIG. 1 may include a master piston 410, a slave piston 420, a motor (not illustrated) to provide power to the master piston 410, a solenoid valve (not illustrated) to lock a brake during parking brake operation, and brake disks 430 and 440.

The electromechanical brake system may advance the pistons 410 and 420 of the piston unit using power generated through the motor and pressurize the brake disks 430 and 440, in order to obtain a braking force.

Furthermore, an electromechanical brake system using a hydraulic device may advance the pistons 410 and 420 of the piston unit using oil pressure transmitted through the solenoid valve 200 and pressurize the brake disks 430 and 440, in order to obtain a braking force.

The solenoid valve 200 may transmit oil pressure, which is generated by the master cylinder 100 through a manipulation force for the brake pedal 110, to the piston unit.

The piston unit may pressurize the brake disks 430 and 440 through at least one of the oil pressure transmitted through the solenoid valve 200 and the power generated by the motor.

The piston unit may include a master piston 410 which is directly pressurized by at least one of the oil pressure transmitted through the solenoid valve 200 and the power generated by the motor and a slave piston 420 which is pressurized by oil pressure generated through the pressurizing force of the master piston 410.

In this way, a boosting force may be generated through a difference in diameter between the master piston 410 and the slave piston 420. Thus, a gear for transmitting the rotary power of the motor to the brake disks 430 and 440 may be removed, the occurrence of noise may be substantially prevented, and the space occupied by the brake mechanism 400 may be reduced.

The electronic control unit 300 may control the advance and retreat of the pistons included in the piston unit by controlling at least one of the oil pressure transmitted through the solenoid valve 200 and the power transmitted by the motor.

As described above, the electromechanical brake system may pressurize the brake disks only through the power provided by the motor, but the electromechanical brake system using a hydraulic device may pressurize the brake disks through oil pressure for emergency braking.

Thus, the electronic control unit 300 may control the opening/closing of the solenoid valve 200 such that the oil pressure generated by the master cylinder 100 based on the manipulation force for the brake pedal 110 is transmitted to the piston unit.

Furthermore, the electronic control unit 300 may control the rotation direction and torque of the motor such that the power provided by the motor pressurizes the brake disks 430 and 440 based on the manipulation force of the brake pedal 110.

When a driver starts the vehicle to initialize the electromechanical brake system having a parking brake function, the vehicle may be in a parking brake state where a parking brake is locked, and may not be in a parking brake state because the parking brake is not locked.

When the brake system is controlled in such a manner that a braking force applied during the initialization of the brake system is constant regardless of whether or not the vehicle is in a parking brake state, an insufficient braking force may be applied when the vehicle is not in a parking brake state, or an excessive braking force may be applied when the vehicle is in a parking brake state.

In the brake system having such a structure that transmits the power of the motor to the disks 430 and 440 through the master piston 410 and the slave piston 420 instead of a gear, the positions of the master piston 410 and the slave piston 420 may differ from each other before the vehicle is started. Thus, while the brake system is initialized, the positions of the master piston 410 and the slave piston 420 need to be matched with each other.

Thus, when the brake system is initialized, the electronic control unit 300 may determine whether or not the vehicle is in a parking brake state, and control the brake system in different manners depending on the determination result.

When the brake system is initialized, the electronic control unit 300 may retreat and depressurize the pistons included in the piston unit in case where the vehicle is in a parking brake state, and may advance and pressurize the pistons included in the piston unit in case where the vehicle is not in a parking brake state.

At this time, the electronic control unit 300 may first open the solenoid valve 200 to supply oil pressure to the brake mechanism 400. Thus, even when the power of the vehicle is not operated, a braking force may be secured.

When the vehicle is not in a parking brake state, the electronic control unit 300 controls the pistons to advance until a current sensed through the solenoid exceeds a preset first reference value, because a braking force is not applied by the solenoid.

Furthermore, when the vehicle is in a parking brake state, the electronic control unit 300 controls the pistons to retreat until the current sensed through the solenoid becomes less than a preset second reference value, because the braking force is already secured through the solenoid for parking brake.

The electronic control unit 300 may determine whether or not the braking force is proper, depending on whether or not the current sensed through the solenoid reached a reference value.

Furthermore, the electronic control unit 300 may determine whether or not the vehicle is in a parking brake state, in order to initialize the brake system.

At this time, the electronic control unit 300 may apply a voltage to the solenoid in a direction where the brake is released, and determine whether or not the vehicle is in a parking brake state, based on the current sensed by the solenoid, when the motor is rotated in a direction to pressurize the brake disks 430 and 440.

When the current sensed through the solenoid increases immediately after the rotation of the motor, the electronic control unit 300 may determine that the vehicle is in a parking brake state. When the current increases in a predetermined time after the rotation of the motor, the electronic control unit 300 may determine that the vehicle is not in a parking brake state. That is, the electronic control unit 300 may determine whether or not the vehicle is in a parking brake state, depending on whether or not an air gap exists.

Also, after the electronic control unit 300 controls the braking force of the vehicle by controlling the pistons depending on whether or not the vehicle is in a parking brake state, the electronic control unit 300 controls the piston unit to reach a state at which the master piston 410 and the slave piston 430 included in the piston unit are contacted with each other.

At this time, the electronic control unit 300 may close the solenoid valve 200 and then control the motor to advance the pistons included in the piston unit to the point at which the pressure of the piston unit is not increased any more, in order to determine the state at which the master piston 410 and the slave piston 420 are contacted with each other.

That is, the electronic control unit 300 may close the solenoid valve 200 such that the braking force of the brake mechanism is generated only through the control of the electronic control unit 300. In this case, since the pistons may be moved only through the control of the electronic control unit 300, it is possible to guarantee that the positions of the master piston 410 and the slave pistons 420 are matched with each other.

In this case, when the pistons are advanced, the master piston 410 may be moved a longer distance than the slave piston 420, due to the difference in diameter between the master piston 410 and the slave piston 420. Then, the master piston 410 and the slave piston 420 will come in contact with each other.

At this time, when the pistons are advanced to the point at which the pressure of the piston unit is not increased any more, the boosting force based on the difference in diameter between the master piston 410 and the slave piston 420 is not generated any more. Thus, the electronic control unit 300 may determine that the master piston 410 and the slave piston 420 are contacted with each other.

In this way, when the brake system is initialized, the positions of the master piston 410 and the slave piston 420 may be matched with each other, which makes it possible to substantially prevent a malfunction of the brake.

Figure 3:
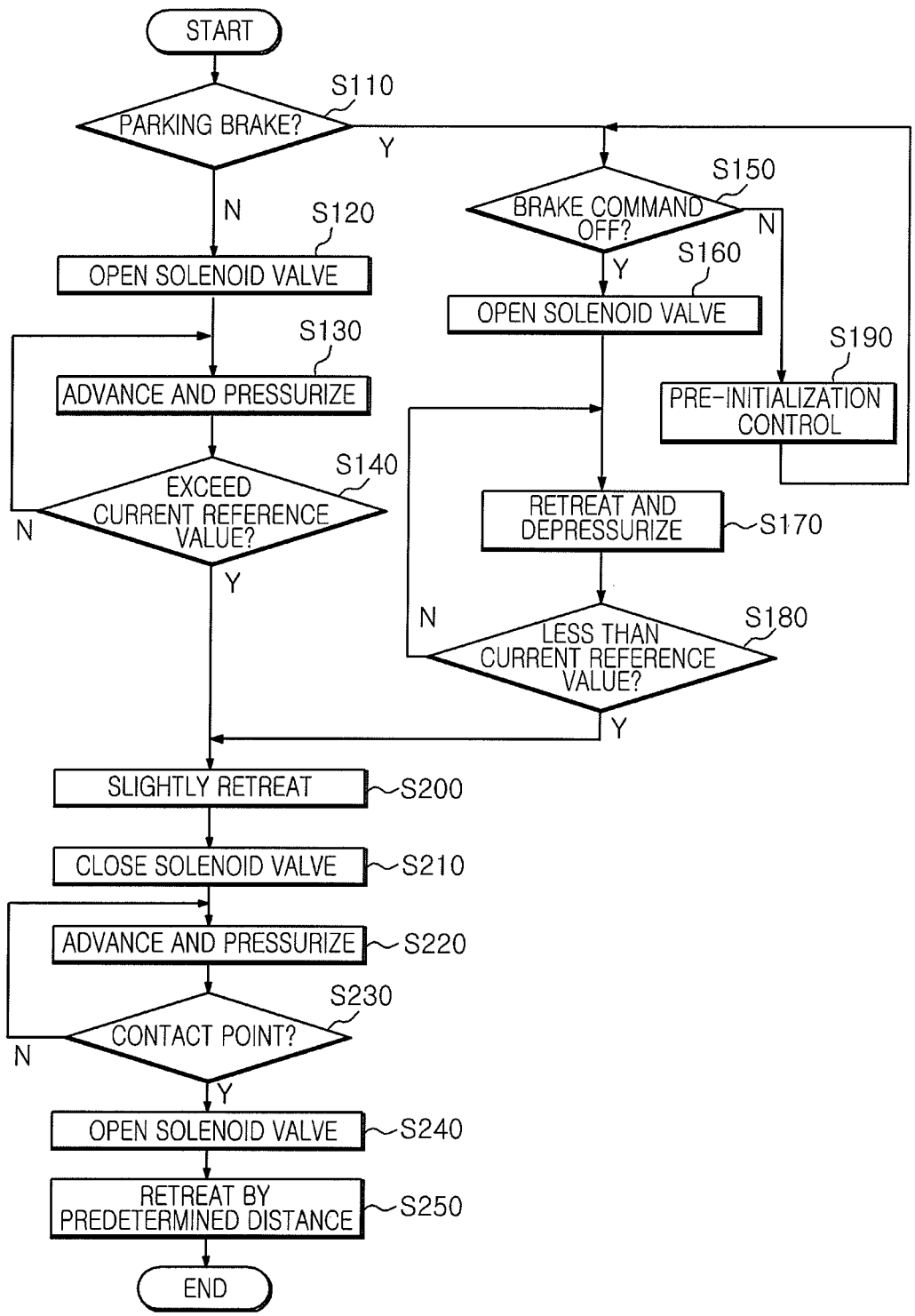
FIG. 3 is a flowchart illustrating a method for initializing an electromechanical brake in accordance with an embodiment of the present invention.

FIG. 3 is a flowchart illustrating a method for initializing an electromechanical brake in accordance with an embodiment of the present invention.

Referring to FIG. 3, the method for initializing an electromechanical brake in accordance with the embodiment of the present invention will be described.

First, the electronic control unit 300 may determine whether or not the vehicle is in a parking brake state, at step S110.

At this time, the electronic control unit 300 may apply a voltage to the solenoid in a direction where the brake is released. When the motor is rotated in a direction to pressurize the brake disks 430 and 440, the electronic control unit 300 may determine whether or not the vehicle is in a parking brake state, based on the current sensed through the solenoid.

When the current sensed through the solenoid increases immediately after the rotation of the motor, the electronic control unit 300 may determine that the vehicle is in a parking brake state. When the current increases in a predetermined time after the rotation of the motor, the electronic control unit 300 may determine that the vehicle is not in a parking brake state. That is, the electronic control unit 300 may determine whether or not the vehicle is in a parking brake state, depending on whether or not an air gap exists.

When it is determined at step S100 that the vehicle is not in a parking brake state, the electronic control unit 300 may open the solenoid valve 200 at step S120.

Then, the electronic control unit 300 may control the motor included in the brake mechanism 400 so as to advance the pistons included in the piston unit, at step S130.

As the solenoid value 200 is opened, a braking force may be secured even when the power of the vehicle is not operated.

Then, the electronic control unit 300 may determine whether or not the current sensed through the solenoid exceeds a preset first reference value, at step S140.

When it is determined at step S140 that the current is equal to or less than the reference value, it may indicate that the braking force did not reach a state suitable for initialization. Thus, the electronic control unit 300 may repeat steps S130 and S140 to control the brake mechanism 400 until the braking force reaches a suitable state.

On the other hand, when it is determined at step S140 that the current exceeds the reference value, it may indicate that the braking force reached a state suitable for initialization. Thus, the process may proceed to step S200 to continue the initialization for the brake system.

As described above, when the vehicle is not in a parking brake state, the electronic control unit 300 may advance and pressurize the pistons included in the piston unit so as to obtain a braking force suitable for the initialization for the brake system.

When it is determined at step S100 that the vehicle is in a parking brake state, the electronic control unit 300 may determine whether or not both of a main brake command and a parking brake command, which are inputted to the electronic control unit 300, are in an off state, at step S150.

When the brake commands are not in an off state, it may indicate that a braking force is applied to the vehicle, for example, a driver steps on a brake pedal. In this case, the brake system cannot be initialized. Thus, the electronic control unit 300 may perform pre-initialization control for controlling the braking force of the brake mechanism 400 through general current control at step S190, and performs step S150 until the brake commands are turned off.

When the brake commands are in an off state, the electronic control unit 300 may open the solenoid valve 200 at step S160.

As the solenoid valve 200 is opened, the braking force may be secured even when the power of the vehicle is not operated.

Then, the electronic control unit 300 may control the motor included in the brake mechanism 400 to retreat and depressurize the pistons included in the piston unit at step S170.

Then, the electronic control unit 300 may determine whether or not the current sensed through the solenoid is less than the preset first reference value, at step S180.

When it is determined at step S180 that the current is equal to or more than the reference value, it may indicate that the braking force did not reach a state suitable for initialization. Thus, the electronic control unit 300 may repeat steps S170 and S170 to control the brake mechanism 400 until the braking force reaches a suitable state.

When it is determined at step S180 that the current is less than the reference value, it may indicate that the braking force reached a state suitable for initialization. Thus, the process may proceed to the step S200 to continue the initialization for the brake system.

As described above, when the vehicle is in a parking brake state, the electronic control unit 300 may retreat and depressurize the pistons included in the piston unit so as to obtain a braking force suitable for the initialization for the brake system.

Then, the electronic control unit 300 may slightly retreat the pistons included in the piston unit at step S200.

As the pistons are slightly retreated, the operation of the pistons may be stabilized before the pistons are advanced and pressurized.

Then, the electronic control unit 300 may close the solenoid valve 200 at step S210.

As described above, the electronic control unit 300 may close the solenoid valve 200 such that the braking force of the brake mechanism is generated only through the control of the electronic control unit 300. In this case, since the pistons may be moved only through the control of the electronic control unit 300, it is possible to guarantee the positions of the master piston 410 and the slave piston 420 may be matched with each other.

Then, the electronic control unit 300 may advance and pressurize the pistons included in the piston unit at step S220.

Then, the electronic control unit 300 may determine whether or not the piston unit reached a state (a point) at which the master piston and the slave piston are contacted with each other, at step S230.

At this time, the electron electronic control unit 300 may advance the pistons included in the piston unit to the point at which the pressure of the piston unit is not increased any more, in order to determine the state(the point) at which the master piston 410 and the slave piston 420 are contacted with each other.

When it is determined at step S230 that the piston unit did not reach the state at which the master piston and the slave piston are contacted with each other, the electronic control unit 300 may repeat steps S220 and S230 to control the piston unit to reach the state at which the master piston and the slave piston of the piston unit are contacted with each other.

When it is determined at step S230 that the piston unit reached the state at which the master piston and the slave piston are contacted with each other, the electronic control unit 300 may open the solenoid valve 200 to normally supply a braking force to the brake system even through oil pressure, at step S240.

Then, the electronic control unit 300 may retreat the pistons included in the piston unit by a predetermined distance at step S250, and then end the process.

As the pistons are retreated by the predetermined distance, the brake system may be initialized while a proper braking force is maintained in a state where the positions of the master piston 410 and the slave piston 420 are matched with each other.

In accordance with the embodiments of the present invention, when the electromechanical brake system is initialized, the electronic control unit may pressurize the pistons in case where the vehicle is in a main brake state (that is, not in a parking brake state), or depressurize the pistons in case where the vehicle is in a parking brake state. Thus, it is possible to match the positions of the master piston and the slave piston and substantially prevent a malfunction of the brake system.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. An apparatus comprising an electromechanical brake (EMB) of a vehicle, the apparatus comprising:
    a master cylinder operably connected to a brake pedal and configured for generating oil pressure in response to external force applied to the brake pedal;
    a brake mechanism configured for pressurizing a brake disk and comprising at least one piston and a motor;
    a valve configured for selectively transmitting the oil pressure generated in the master cylinder to the brake mechanism to force the at least one piston for pressurizing the brake disk;
    an electronic control unit for generating an oil pressure signal based on the oil pressure generated in the master cylinder for controlling the motor to move the at least one piston for pressurizing the brake disk; and
    wherein the electronic control unit is further configured to generate piston initialization signals for controlling the motor to advance and retreat the at least one piston relative to the brake disk,
    wherein in response to starting of the vehicle, when the vehicle is in a parking brake state, the electronic control unit is configured to generate a first piston initialization signal for retreating the at least one piston that depressurizes the brake disk,
    wherein further in response to starting of the vehicle, when the vehicle is not in a parking brake state, the electronic control unit is configured to generate a second piston initialization signal for advancing the at least one piston that pressurizes the brake disk.

2. The apparatus of claim 1, wherein the brake mechanism comprises a master piston, a slave piston and a chamber between the master piston and the slave piston, the master piston configured for being pressurized by at least one of the oil pressure transmitted through the valve or by power generated by the motor, the slave piston configured for being pressurized by oil pressure generated by movement of the master piston, and
    wherein the electronic control unit is further configured to control the brake mechanism to reach a state at which the master piston and the slave piston contact with each other.

3. The apparatus of claim 2, wherein the electronic control unit is configured to close the valve and also to advance the master and slave pistons until the pressure within the chamber does not increase further, in order to determine the state at which the master piston and the slave piston contact with each other.

4. The apparatus of claim 1, further comprising a solenoid configured for locking the brake mechanism,
wherein the electronic control unit is configured to apply a voltage to the solenoid for releasing the brake mechanism, and
wherein the electronic control unit is configured to determine whether the vehicle is in the parking brake state based on a current sensed through the solenoid as the motor rotates for pressurizing the brake disk.

5. The apparatus of claim 4, wherein the electronic control unit is configured to determine that the vehicle is in the parking brake state when the current through the solenoid increases immediately after rotation of the motor, and
wherein the electronic control unit is configured to determine that the vehicle is not in the parking brake state when the current through the solenoid increases in a predetermined time after rotation of the motor.

6. A method for initializing an electromechanical brake utilizing the apparatus of claim 1, the method comprising:
in response to starting of a vehicle determining whether the vehicle is in the parking brake state;
retreating the at least one piston for depressurizing the brake disk when the vehicle is in the parking brake state;
advancing the at least one piston for pressurizing the brake disk when the vehicle is not in the parking brake state.

7. The method of claim 6, wherein the brake mechanism comprises a master piston, a slave piston and a chamber between the master piston and the slave piston, and the master piston configured for being pressurized by at least one of the oil pressure transmitted through the valve or by power generated by the motor, the slave piston configured for being pressurized by oil pressure generated by movement of the master piston,
wherein the method further, comprises:
closing the valve and advancing the master and slave pistons until the pressure within the chamber does not increase further, and
determining that the vehicle is in a state at which the master piston and the slave piston contact with each other.

8. The method of claim 6, wherein in determining whether the vehicle is in the parking brake state, the electronic control unit applies a voltage to a solenoid for releasing the brake mechanism, and
wherein the electronic control unit determines whether the vehicle is in the parking brake state, based on a current sensed through the solenoid as the motor rotates for pressurizing the brake disk.

9. The method of claim 8, wherein when the current through the solenoid increases immediately after rotation of the motor, the electronic control unit determines that the vehicle is in the parking brake state, and
when the current increases in a predetermined time after rotation of the motor, the electronic control unit determines that the vehicle is not in the parking brake state.

* * * * *